(12) United States Patent
Zheng

(10) Patent No.: US 9,853,896 B2
(45) Date of Patent: Dec. 26, 2017

(54) METHOD, DEVICE, AND VIRTUAL PRIVATE NETWORK SYSTEM FOR ADVERTISING ROUTING INFORMATION

(71) Applicant: Huawei Technologies Co., Ltd., Shenzhen, Guangdong (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 13/896,050

(22) Filed: May 16, 2013

(65) Prior Publication Data
US 2013/0250947 A1 Sep. 26, 2013

Related U.S. Application Data

(63) Continuation of application No. PCT/CN2011/083093, filed on Nov. 29, 2011.

(30) Foreign Application Priority Data

Dec. 27, 2010 (CN) .......................... 2010 1 0607474

(51) Int. Cl.
*G06F 15/16* (2006.01)
*H04L 12/749* (2013.01)
(Continued)

(52) U.S. Cl.
CPC ............ *H04L 45/741* (2013.01); *H04L 45/02* (2013.01); *H04L 45/54* (2013.01); *H04L 45/04* (2013.01);
(Continued)

(58) Field of Classification Search
CPC ...................................................... H04L 12/26
See application file for complete search history.

(56) References Cited

U.S. PATENT DOCUMENTS 7,139,818 B1 * 11/2006 Kinnear, Jr. ...... H04L 29/12273
709/222
9,391,921 B1 * 7/2016 Riddle ................ H04L 41/0893
(Continued)

FOREIGN PATENT DOCUMENTS

CN         1852214 A      10/2006
CN       101114973 A       1/2008
(Continued)

OTHER PUBLICATIONS $1^{st}$ Office Action in corresponding Chinese Patent Application No. 201010607474.4 (dated Dec. 27, 2012).
(Continued)

*Primary Examiner* — Siren Wei
(74) *Attorney, Agent, or Firm* — Leydig, Voit & Maher, Ltd.

(57) ABSTRACT

The present invention discloses a method for advertising routing information, and embodiments of the present invention further provide a virtual private network server device, an IP edge node device, and a client-based virtual private network system. In the technical solutions of the present invention, a virtual private network server first collects MAC address routing information of each site on a local virtual private network and then sends MAC address routing information of each site except a destination site in a unicast manner to a customer edge node that corresponds to each site on the virtual private network. This solves the problem that CE nodes in sites on the virtual private network cannot exchange routing information with each other by using a routing protocol because multicast packets are filtered by an access node of the data center network.

14 Claims, 10 Drawing Sheets

(51) Int. Cl.
  *H04L 12/751* (2013.01)
  *H04L 12/741* (2013.01)
  *H04L 29/12* (2006.01)
  *H04L 12/721* (2013.01)
  *H04L 12/715* (2013.01)

(52) U.S. Cl.
  CPC ............ *H04L 45/66* (2013.01); *H04L 61/203* (2013.01); *H04L 61/2015* (2013.01)

(56) References Cited

U.S. PATENT DOCUMENTS

| | | |
|---|---|---|
| 2004/0049597 A1 | 3/2004 | Ould-Brahim |
| 2007/0127461 A1 | 6/2007 | Yamada et al. |
| 2008/0089334 A1* | 4/2008 | Soja-Molloy ............ H04L 45/00 370/392 |
| 2009/0037607 A1* | 2/2009 | Farinacci ............ H04L 12/4641 709/249 |
| 2010/0278183 A1 | 11/2010 | Gu et al. |
| 2010/0287266 A1* | 11/2010 | Asati .................... H04L 12/4641 709/222 |
| 2010/0309915 A1* | 12/2010 | Pirbhai ............ H04L 29/12028 370/392 |
| 2011/0182189 A1* | 7/2011 | Martini et al. ................ 370/248 |

FOREIGN PATENT DOCUMENTS

| | | |
|---|---|---|
| CN | 101227407 A | 7/2008 |
| CN | 101471841 A | 7/2009 |
| CN | 102137173 A | 7/2011 |
| EP | 2224645 A1 | 9/2010 |

OTHER PUBLICATIONS

Written Opinion of the International Searching Authority in corresponding PCT Patent Application No. PCT/CN2011/083093 (dated Mar. 15, 2012).

International Search Report in corresponding PCT Patent Application No. PCT/CN2011/083093 (dated Mar. 15, 2012).

\* cited by examiner

METHOD, DEVICE, AND VIRTUAL PRIVATE NETWORK SYSTEM FOR ADVERTISING ROUTING INFORMATION

CROSS-REFERENCE TO RELATED APPLICATIONS

This application is a continuation of International Patent Application No. PCT/CN2011/083093, filed on Nov. 29, 2011, which claims priority to Chinese Patent Application No. 201010607474.4, filed on Dec. 27, 2010, both of which are incorporated herein by reference in their entireties.

TECHNICAL FIELD

The present invention relates to the field of communications technologies, and in particular to a method, a device, and a virtual private network system for advertising routing information.

BACKGROUND

A virtual private network (VPN) is defined as a temporary and secure connection that is established through a public network (commonly the Internet). It is a secure and steady tunnel that passes through the disordered public network. Data may be encrypted multiple times by using this tunnel, to achieve an objective of secure usage of the Internet. The virtual private network is an extension to an intranet. The virtual private network may help a remote user, a company branch, a business partner, and a supplier to establish a credible security connection to an intranet of a company and ensures the security of data transmission.

The VPN is classified into a client-based VPN and a network-based VPN according to whether it is implemented by an enterprise customer or a service provider. A client-based VPN establishes a tunnel between a customer edge node (CE) and another CE, and directly transfers routing information. Routing protocol data is always exchanged between customer devices, so that a carrier network may know nothing about the structure of a customer network. In addition, different customer address spaces may overlap with good confidentiality and security. Therefore, after the concepts of "cloud computing"/"data center" are proposed, it becomes a research hotspot to implement "cloud computing"/"data center" interconnection on the client-based VPN.

On an access network defined by the Broadband Forum, such as a TR101 digital subscriber loop access network or a passive optical access network, the "cloud computing"/"data center" interconnection is implemented on the client-based virtual private network, as shown in FIG. 1A. FIG. 1A shows a client-based virtual private network on the TR101 digital subscriber loop access network. In FIG. 1A, site 1, site 2, and site 3 belong to a same virtual private network a, and the identifier of the virtual private network is VPN1. Each site is a data center, and in each site, there are one customer edge node and several user terminals. A site accesses data center interconnect network through a customer edge node and an access node (for example, a DSLAM). The data center interconnect network includes an access node for site access and an IP edge device. An IP edge node may be a broadband remote access server (BRAS), a broadband network gateway (BNG), or the like.

Between CE nodes, the Intermediate System to Intermediate System routing protocol (IS-IS) uses a flooding mechanism to multicast routing information. A problem is that, the access network, that is, the data center interconnect network, does not support user multicast. Therefore, an IS-IS multicast packet from a CE node will be filtered by an access node, that is, CE nodes in different sites cannot exchange routing information with each other by using a routing protocol.

The preceding problem not only exists on a client-based virtual private network on which cloud computing interconnection is implemented, but also may exist on other networks.

SUMMARY

The present invention provide a method, a device, and a client-based virtual private network system for advertising routing information, which solves the following problem: On a client-based virtual private network system, a multicast packet of a customer edge node is filtered by a provider edge node of an access network, that is, the data center interconnect network; as a result, CE nodes in sites on the client-based virtual private network system cannot exchange routing information with each other by using a routing protocol.

A first aspect of the present invention provides a method for advertising routing information, where the method includes:

collecting, by a virtual private network server, first media access control (MAC) address routing information, where the first MAC address routing information is a set of MAC address routing information of each site on a virtual private network on which the virtual private network server resides, and the virtual private network server is configured to manage the MAC address routing information of each site on the virtual private network the virtual private network server; and sending, by the virtual private network server, second MAC address routing information in a unicast manner to a destination site, where the second MAC address routing information is a set of MAC address routing information of each site in the first MAC address routing information except the MAC address routing information of the destination site.

A second aspect of the present invention provides a method for advertising routing information, where the method includes:

receiving, by an IP edge node, an authentication message sent by a customer edge node that corresponds to each site on a virtual private network, where the authentication message carries information of the customer edge node;

acquiring an identifier of a corresponding virtual private network from preset correspondence between the customer edge node and the virtual private network according to the information of the customer edge node; and acquiring an address of a virtual private network server according to the identifier of the virtual private network, and sending the address of the virtual private network server to the customer edge node, where the address of the virtual private network server comprises an IP address or a MAC address.

A third aspect of the present invention provides a virtual private network server device, which is a node configured to manage MAC address routing information of each site on a virtual private network and includes:

a first collection module, configured to collect first MAC address routing information, where the first MAC address routing information is a set of MAC address routing information of each site on a virtual private network on which the virtual private network server device resides; and a sending module, configured to send second MAC address routing information in a unicast manner to a destination site, where the second MAC address routing information is a set of MAC address routing information in the first MAC address routing information except MAC address routing information of the destination site.

A fourth aspect of the present invention provides an IP edge node device, which includes:

a receiving module, configured to receive an authentication message sent by a customer edge node that corresponds to each site on a virtual private network, where the authentication message carries information of the customer edge node, and the information of the customer edge node comprises information of a MAC address, a user identifier or a physical line;

a virtual private network identifier acquiring module, configured to acquire an identifier of a corresponding virtual private network from preset correspondence between the customer edge node and the virtual private network according to the information of the customer edge node carried in the authentication message that is received by the receiving module;

a virtual private network server address acquiring module, configured to acquire an address of a virtual private network server according to the identifier of the virtual private network, where the address of the virtual private network server comprises an IP address or a MAC address; and a sending module, configured to send the address of the virtual private network server to the customer edge node.

A fifth aspect of the present invention provides a client-based virtual private network system, which includes:

the virtual private network server device of the third aspect, an IP edge node device configured to acquire an address of the virtual private network server device and send the address of the virtual private network server to a customer edge node, and the customer edge node device, configured to acquire an address of a virtual private network server on a virtual private network on which the customer edge node device resides and MAC address information of a local site, and then send MAC address routing information of the local site to the virtual private network server, where the address of the virtual private network server may be an IP address or a MAC address.

In the embodiments of the present invention, a VPN server is used to collect MAC address routing information of each site on a local virtual private network, and send, in a unicast manner, the MAC address routing information of each site except that of a destination site to a customer edge node that corresponds to each site on the virtual private network. In this way, one node on the virtual private network is used as a server to collect and send MAC address routing information on the virtual private network, thereby solving the following problem: Because multicast packets are filtered by an access node of the data center interconnect network, CE nodes in sites on the virtual private network cannot exchange routing information with each other by using a routing protocol.

DESCRIPTION OF EMBODIMENTS

Embodiments of the present invention provide a method for advertising routing information, and the embodiments of the present invention further provide a corresponding device and a client-based virtual private network system. The embodiments of the present invention are described in detail in the following.

Figure 1A:
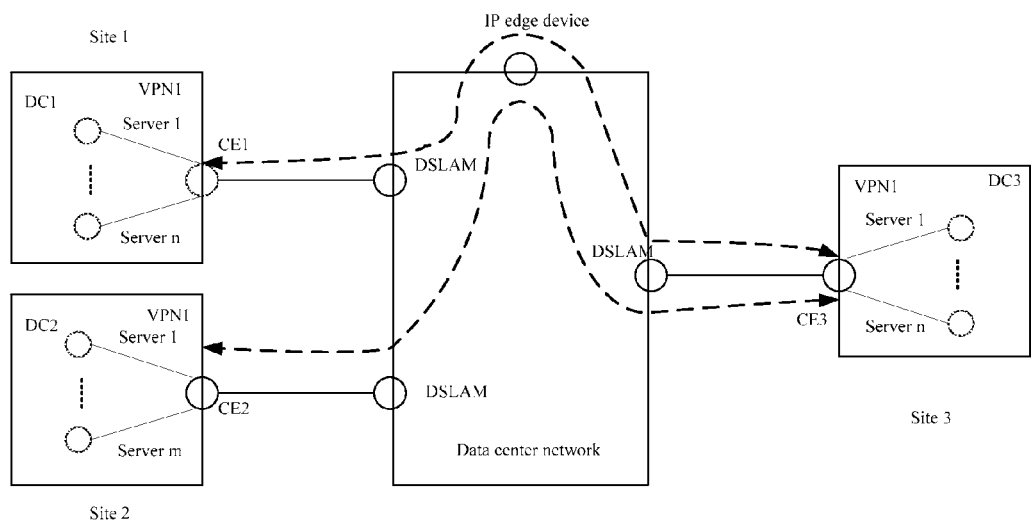
FIG. 1A is a schematic architecture diagram of a client-based virtual private network on a digital subscriber loop access network.
Figure 1B:
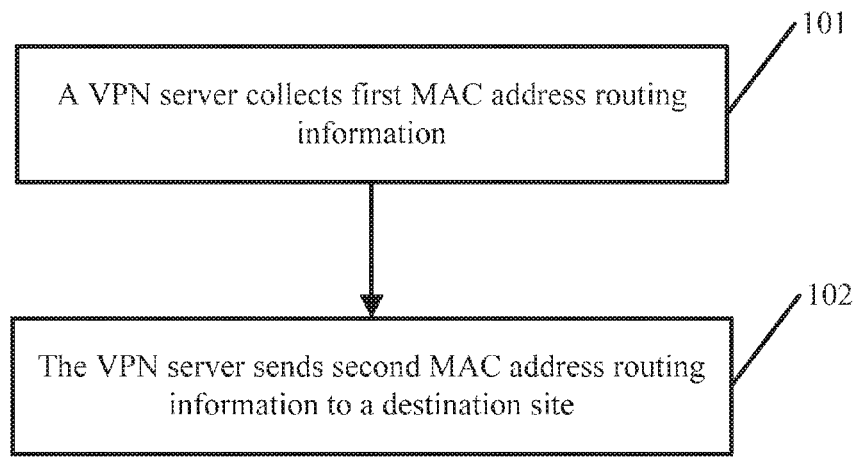
FIG. 1B is a schematic flowchart of a method for advertising routing information according to a first embodiment of the present invention.

Referring to FIG. 1B, a method for advertising routing information according to a first embodiment of the present invention specifically includes:

101. A VPN server collects first MAC address routing information.

The VPN server is a node that manages MAC address routing information of each site on a virtual private network on which the VPN server resides. An IP edge device selects a VPN server from CE nodes according to a preset rule. For example, the IP edge device may acquire an address of a virtual private network server by extending an authentication protocol to carry the address of the virtual private network server, or acquire an address of a virtual private network server by extending a dynamic host configuration protocol option to carry the address of the virtual private network server, or acquire an address of a virtual private network server by using the TR069 protocol.

The VPN server collects the first MAC address routing information, where the first MAC address routing information is a set of MAC address routing information of each site on the virtual private network on which the VPN server resides.

Each VPN includes multiple sites and each site includes multiple nodes, where MAC address routing information of a site is a combination of MAC address information of each node (such as a terminal device, a server, or a virtual machine) and MAC address routing information of a CE node in the site.

102. The VPN server sends second MAC address routing information to a destination site.

The VPN server sends the second MAC address routing information in a unicast manner to the destination site, where the destination site includes multiple nodes. In this embodiment, the VPN server sends the second MAC address routing information in the unicast manner to a customer edge node that corresponds to each site except a local site on which the VPN server resides, where the second MAC address routing information is a set of MAC address routing information in the first MAC address routing information except MAC address routing information of the destination site.

The idea expressed in the method in the embodiment of the present invention is as follows: On each VPN, one node is selected as a server to manage node information, such as a MAC address, of each node; first, each node on the network sends respective node information in a unicast manner to the server, and then the server arranges and sends node information of all nodes except a object node in the unicast manner to the sending object node. This solves the following problem brought by broadcast in a network: A certain node does not support broadcast and therefore filters out broadcast information; as a result, the broadcast information cannot be sent to other nodes on the network. Multiple VPNs may be deployed on one physical network, and each VPN manages information of each node of its own. Therefore, on each VPN, centralized management is performed on node information of each node, but on the entire physical network, distributed management is performed on node information on each VPN. The idea expressed in the method in this embodiment not only can be applied to a client-based virtual private network on which cloud computing interconnection is implemented, but also can be applied to other networks where the same problem needs to be solved. In this embodiment, the client-based virtual private network on which cloud computing interconnection is implemented is used as an example to describe the present invention in detail.

In this embodiment, on a client-based virtual private network on which cloud computing interconnection is implemented, a VPN server collects MAC address routing information of each site on the local virtual private network and sends MAC address routing information of each site except a destination site in the unicast manner to a customer edge node that corresponds to each site on the virtual private network. In this way, one node on the virtual private network is used as the server to collect and send MAC address routing information on the virtual private network, thereby solving the following problem: Because multicast packets are filtered by an access node of the data center interconnect network, CE nodes in sites on the virtual private network cannot exchange routing information with each other by using a routing protocol.

Figure 2A:
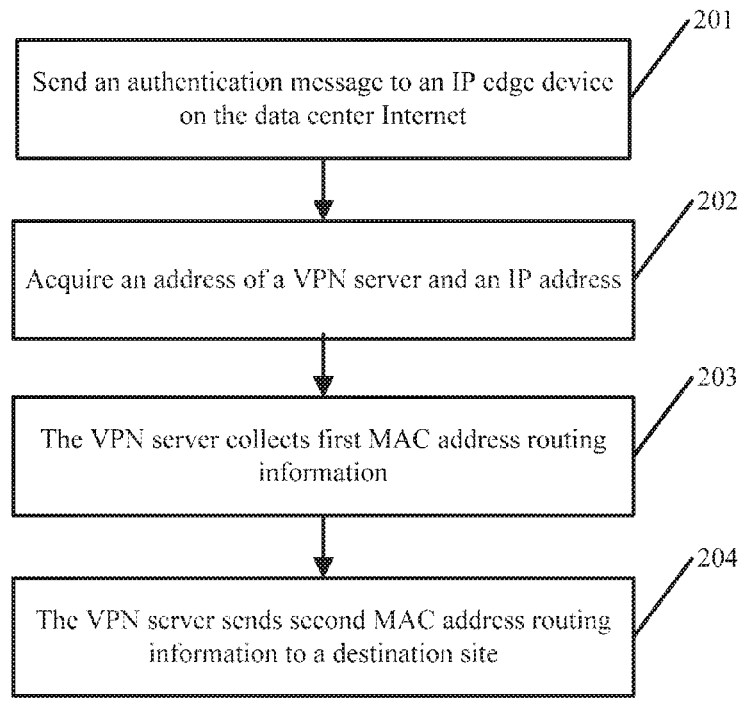
FIG. 2A is a schematic flowchart of a method for advertising routing information according to a second embodiment of the present invention.

Referring to FIG. 2A, a method for advertising routing information according to a second embodiment of the present invention specifically includes:

201. Send an authentication message to an IP edge device on a data center interconnect network.

A CE node sends an authentication message to the IP edge device on the data center interconnect network, where the authentication message may be a DHCP message, and the authentication message carries information, such as a MAC address, of the CE node.

202. Acquire an address of a VPN server and an IP address.

The IP edge device receives a dynamic host configuration protocol (DHCP) message sent by the CE node. The IP edge device assigns an IP address to the CE node by using a DHCP server and sends the IP address to the CE node.

The IP edge device further establishes correspondence between the CE node and a corresponding IP address. The correspondence may be implemented in a correspondence table, a diagram, a tree structure, or the like. The correspondence table is used as an example herein. As listed in Table 1, the correspondence may be implemented by locally saving a correspondence table between the CE node and the corresponding IP address:

TABLE 1

| CE Node | IP Address |
|---------|------------|
| CE1     | 192.168.1.1 |
| CE2     | 192.168.2.1 |
| CE3     | 192.168.3.1 |

The CE node receives the IP address returned by the IP edge device, and uses the IP address as the IP address of the CE node itself.

The CE node further requires the address of the VPN server. The details are as follows:

The IP edge device selects a VPN server from each CE node according to a preset rule and sends an address (may be an IP address or a MAC address) of the VPN server to each CE node.

Specifically, the address of the virtual private network server may be acquired by extending an authentication protocol to carry the address of the virtual private network server; or the address of the virtual private network server may be acquired by extending a dynamic host configuration protocol option to carry the address of the virtual private network server; or the address of the virtual private network server may be acquired by using the TR069 protocol.

Sending the IP address and the address of the VPN server to each CE node may be simultaneously delivering the IP address and the address of the VPN server by carrying the address of the VPN server during a DHCP process of IP address assignment, and may also be sending the IP address and the address of the VPN server separately, which is not limited herein.

For example, the preset rule specifically is that: first authenticated CE node is used as the VPN server or a CE node that has the maximum bandwidth is used as the VPN server, or the like, which is not listed one by one herein. The preceding two preset rules cannot serve as limitations on the embodiment of the present invention.

203. The VPN server collects first MAC address routing information.

The VPN server collects the first MAC address routing information, where the first MAC address routing information is a set of MAC address routing information of each site on a virtual private network on which the VPN server resides.

Specifically, the VPN server receives MAC address routing information sent by a customer edge node that corresponds to another site on the virtual private network, and obtains MAC address information of a local site through MAC address learning; or the VPN server receives MAC address routing information sent by a customer edge node that corresponds to each site on the virtual private network.

204. The VPN server sends second MAC address routing information to a destination site.

The VPN server sends the second MAC address routing information in a unicast manner to the destination site, where the destination site includes multiple nodes. In this embodiment, the VPN server sends the second MAC address routing information in the unicast manner to a customer edge node that corresponds to each site except the local site, where the second MAC address routing information is a set of MAC address routing information in the first MAC address routing information except MAC address routing information of the destination site.

Specifically, the VPN server bears a routing protocol packet, which carries the second MAC address routing information, in a unicast MAC frame for transmission, where a destination MAC address of the unicast MAC frame is a MAC address of a customer edge node; or a routing protocol packet is borne in a unicast IP packet for transmission, where the destination IP address of the unicast IP packet is an IP address of a customer edge node; or a routing protocol packet is borne on a tunnel for transmission; or a routing protocol packet is transmitted as a routing protocol unicast packet.

Further, the VPN server further collects information of an online customer edge node on the virtual private network on which the VPN server resides to maintain a network topology of the VPN. Specifically, if MAC address routing information of a site sent by a customer edge node is received, it indicates that the customer edge node is in an online state. In this case, the MAC address and/or the IP address of the customer edge node are saved locally, specifically, in a preset list of online customer edge nodes, as listed in Table 2:

TABLE 2

| CE Node | MAC Address |
|---------|-------------|
| CE1 | 00-16-76-07-63-C4 |
| CE2 | 10-23-59-65-89-F7 |
| CE3 | 00-58-27-06-09-P4 |

Definitely, saving the MAC address of the customer edge node in a table manner is not the only manner. Other manners, such as a diagram or a tree structure, may also be used for implementation. This should not be construed as a limitation on the present invention.

Further, the VPN server collects the IP address of a customer edge node that corresponds to each site on the virtual private network on which the VPN server resides. Specifically, if MAC address routing information of a site sent by a customer edge node is received, the IP address of the customer edge node is saved locally, specifically, in a preset IP address information list of customer edge nodes, as listed in Table 3:

TABLE 3

| CE Node | IP Address |
|---------|------------|
| CE1 | 192.168.1.1 |
| CE2 | 192.168.2.1 |
| CE3 | 192.168.3.1 |

Definitely, saving the IP address of the customer edge node in a table manner is not the only manner. Other manners, such as a diagram or a tree structure, may also be used. This should not be construed as a limitation on the present invention.

Further, if an IP address is not dynamically assigned to a customer edge node, the IP address of the customer edge node and an address of a VPN server on a VPN on which the customer edge node resides can be configured statically on the customer edge node in advance.

Further, communication between sites may adopt an Ethernet technology or IP technology. The details are as follows:

It is assumed that a VPN includes three sites, site 1, site 2, and site 3. Site 1 includes a node Server1 and a node CE1, site 2 includes a node Server2 and a node CE2, and site 3 includes a node Server3 and a node CE3.

Figure 2B:
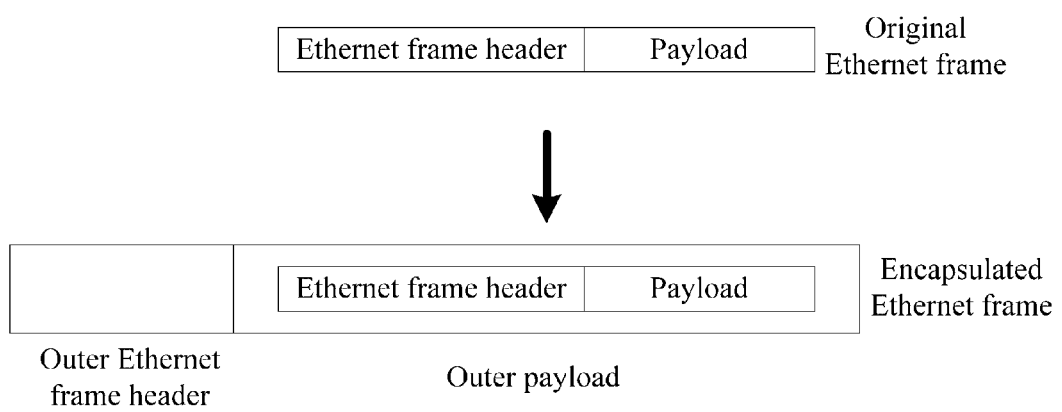
FIG. 2B is a schematic diagram of Ethernet frame encapsulation according to the second embodiment of the present invention.
Figure 2C:
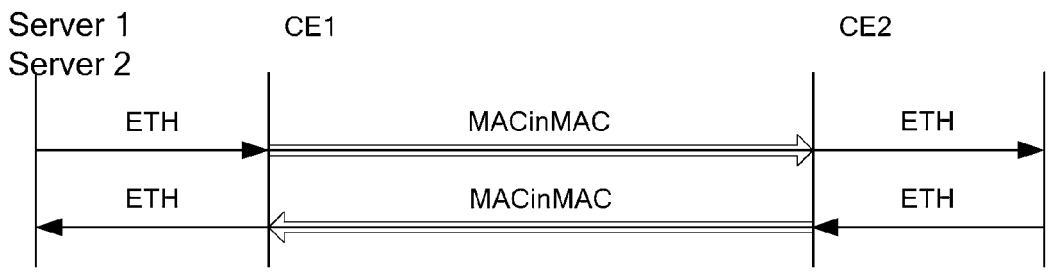
FIG. 2C is a schematic diagram of communication between sites according to the second embodiment of the present invention.

Adopting the Ethernet technology: Taking communication between site 1 and site 2 as an example, an Ethernet frame of a site is encapsulated into the payload of another Ethernet frame and then transmitted to another site on the same VPN. An available existing technology is a provider backbone transport (PBT) technology or MACinMAC encapsulation technology. This is implemented by querying MAC address routing information. Take the MACinMAC encapsulation technology as an example. As shown in FIG. 2B, a source MAC address of an original Ethernet frame is the MAC address of the node Server1 in site 1 (a sending site), and a destination MAC address of the original Ethernet frame is the MAC address of Server2 in site 2 (a destination site). The original Ethernet frame is further encapsulated into an outer payload of an outer Ethernet frame. A source MAC address of the outer Ethernet frame is the MAC address of the customer edge node CE1 that corresponds to site 1 (the sending site), and a destination MAC address of the outer Ethernet frame is the MAC address of the customer edge node CE2 that corresponds to site 2 (the destination site). The CE1 node receives the original Ethernet frame from Sever1 in site 1, the destination address of the original Ethernet frame being Sever2 in site 2, and by querying the MAC address routing information, obtains a next hop address, that is, the MAC address of the CE2 node that corresponds to the MAC address of Sever2. Then, MACin-MAC encapsulation is performed on the received original Ethernet frame and the encapsulated Ethernet frame is sent to the CE2 node. Further, the CE2 node forwards the received original Ethernet frame to Server2. A process in which Server2 in site 2 sends an Ethernet frame to Server1 in site 1 is the same, as shown in FIG. 2C.

Adopting the IP technology: An Ethernet frame of a site is encapsulated into a payload of an IP packet and then transmitted to another site on a same VPN. This can be implemented by querying the MAC address routing information. For example, for the direction from site 1 to site 2, the customer edge node CE1 that corresponds to site 1 receives an Ethernet frame from Server1 in site 1, the destination address of the Ethernet frame being Server2 in site 2, and obtains, by querying the MAC address routing information, that a next hop address that corresponds to the MAC address of Server2 is the address of the customer edge node CE2 that corresponds to site 2. Then, the customer edge node CE1 performs IP encapsulation on the Ethernet frame from Server1 and sends it to CE2. A source IP address of outer Ethernet frame is the IP address of the customer edge node CE1, and a destination IP address of outer Ethernet frame is the IP address of the customer edge node CE2. Then, the customer edge node CE2 forwards the Ethernet frame to Server2.

The idea expressed in the method in the embodiment of the present invention is as follows: On a network, one node is selected as a server to manage node information, such as a MAC address, of each node; first, each node on the network sends respective node information in the unicast manner to the server, and then the server arranges and sends node information of all nodes except a sending object node in the unicast manner to the sending object node. This solves the following problem brought by broadcast in a network: A certain node does not support broadcast and therefore filters out broadcast information; as a result, the broadcast information cannot be sent to other nodes on the network. On each VPN, centralized management is performed on node information of each node, whereas on the entire physical network, distributed management is performed on node information on each VPN. The idea expressed by the method in this embodiment not only can be applied to a client-based virtual private network on which cloud computing interconnection is implemented, but also can be applied to other networks where the same problem needs to be solved. In this embodiment, the client-based virtual private network on which cloud computing interconnection is implemented is used as an example to describe the present invention in detail.

In this embodiment, on the client-based virtual private network on which cloud computing interconnection is implemented, a VPN server is selected on the virtual private network in advance. The VPN server is configured to manage MAC address routing information of each site. The VPN server first collects the MAC address routing information of each site on the local virtual private network, and then sends MAC address routing information of each site except a destination site in the unicast manner to a customer edge node that corresponds to each site on the virtual private network. In this way, one node on the virtual private network is used as the server to collect and send MAC address routing information on the virtual private network, thereby solving the following problem: Because multicast packets are filtered by an access node of the data center interconnect network, CE nodes in sites on the virtual private network cannot exchange routing information with each other by using a routing protocol.

Figure 3A:
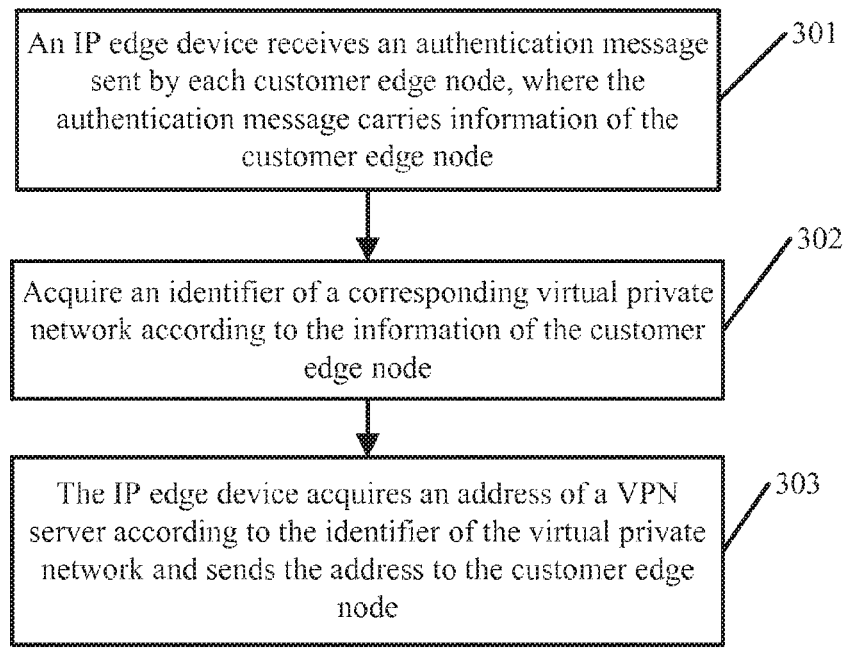
FIG. 3A is a schematic flowchart of a method for advertising routing information according to a third embodiment of the present invention.
Figure 3B:
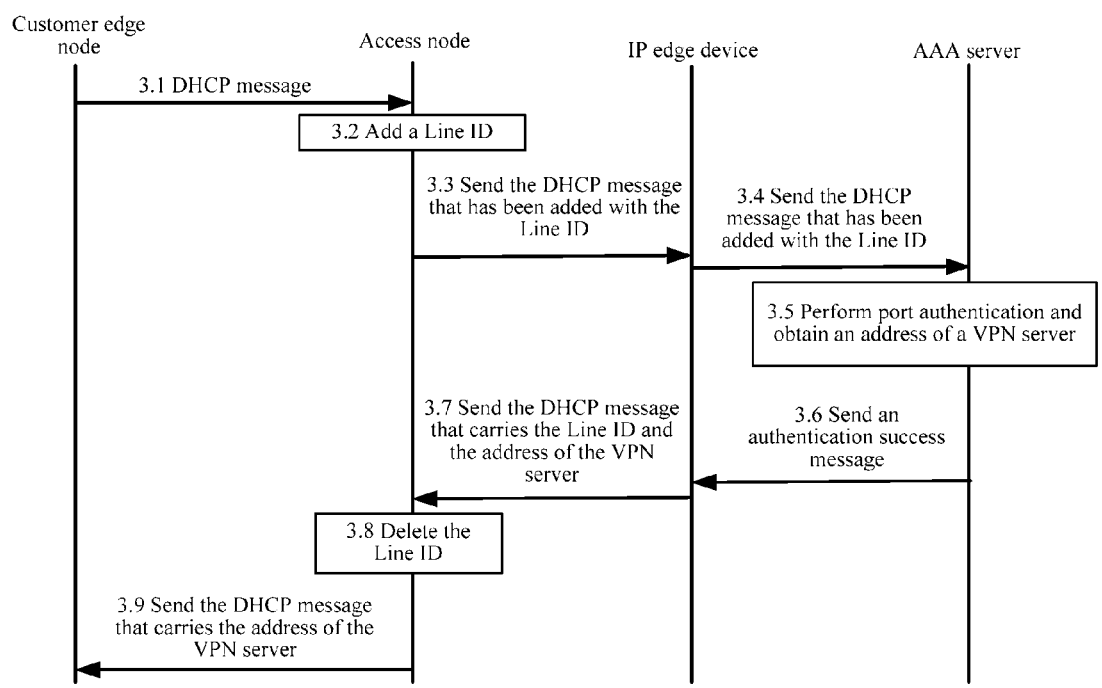
FIG. 3B is a schematic flowchart of a method for advertising routing information according to the third embodiment of the present invention.

Referring to FIG. 3A and FIG. 3B, a method for advertising routing information according to a third embodiment of the present invention specifically includes:

301. An IP edge device receives an authentication message sent by each customer edge node, where the authentication message carries information of the customer edge node.

The IP edge device receives an authentication message sent by a customer edge node that corresponds to each site on a virtual private network, where the authentication message may be a DHCP message, an 802.1X message, an extensible authentication protocol (EAP) message, or a protocol for carrying authentication and network access (Protocol for Carrying Authentication and Network Access, PANA) message, and the authentication message carries the information of the customer edge node, such as information of a MAC address, a user identifier, or a physical line.

302. Acquire an identifier of a corresponding virtual private network according to the information of the customer edge node.

The IP edge device acquires the identifier of the corresponding virtual private network from preset correspondence between the customer edge node and the virtual private network according to the information of the customer edge node. Specifically, the correspondence may be implemented in a correspondence table, a diagram, a tree structure, or the like. The correspondence table is used as an example, as listed in Table 4:

TABLE 4

| MAC Address | VPN Identifier |
|---|---|
| 00-16-76-07-63-C4 | VPN1 |
| 10-23-59-65-89-F7 | VPN1 |
| 00-58-27-06-09-P4 | VPN1 |
| 00-58-27-06-23-K9 | VPN2 |
| 10-23-59-71-64-J8 | VPN3 |

For example, a MAC address carried in a DHCP message which is sent by the customer edge node and received by the IP edge device is 10-23-59-65-89-F7. The IP edge device queries the preset correspondence table 4 between the customer edge node and the virtual private network according to the MAC address 10-23-59-65-89-F7. The MAC address 10-23-59-65-89-F7 corresponds to VPN1, that is, a customer edge node that corresponds to the MAC address 10-23-59-65-89-F7 resides on the virtual private network VPN1.

303. The IP edge device acquires an address of a VPN server according to the identifier of the virtual private network and sends the address to the customer edge node;

The IP edge device acquires the address of the VPN server from preset local correspondence between the identifier of the virtual private network and the address of the VPN server according to the identifier of the virtual private network, and carries the address of the VPN server to the customer edge node by returning the authentication message of the customer edge node. The address of the VPN server may be an IP address or a MAC address. The correspondence may be implemented in a correspondence table, a diagram, a tree structure, or the like. The correspondence table is used as an example. As listed in Table 5, the IP address is used as an example:

I. TABLE 5

| VPN Identifier | IP Address of a VPN Server |
|---|---|
| VPN1 | 192.168.1.1 |
| VPN2 | 192.168.3.1 |
| VPN3 | 192.168.5.1 |

For example, the identifier of the virtual private network is VPN2. The IP edge device queries the preset local correspondence table 5 between the identifier of the virtual private network and the IP address of the VPN server according to the identifier VPN2. The IP address of the VPN server that corresponds to VPN2 is 192.168.3.1.

Further, as shown in FIG. 3B:

3.1 A customer edge node sends a DHCP message (such as a DHCP Request message) to an access node.

3.2 After receiving the DHCP message sent by the customer edge node, the access node acquires, according to a received physical line and from correspondence between the physical line and a Line ID (Line ID), the Line ID that corresponds to the physical line, and adds the Line ID to the received DHCP message, where the correspondence between the physical line and the Line ID may be specifically implemented in a correspondence table, a diagram, a tree structure, or the like.

3.3 The access node sends, to an IP edge node, the DHCP message (such as a DHCP request message) that has been added with the Line ID.

3.4 The IP edge node receives the DHCP message that has been added with the Line ID, and sends, to an AAA server, an AAA message (such as an access request message) which carries the Line ID.

3.5 After receiving the AAA message which carries the Line ID, the AAA server performs port authentication according to the Line ID and obtains an address of a VPN server, where the address may be an IP address or a MAC address. On the AAA server, correspondence between the identifier of the virtual private network and the address of the VPN server, and correspondence between the Line ID and the identifier of the virtual private network identifier are preset, or, correspondence between the Line ID and the address of the VPN server is preset. Therefore, according to the Line ID, the corresponding address of the VPN server can be found; and the correspondence may be specifically implemented in a correspondence table, a diagram, a tree structure, or the like.

3.6 The AAA server returns an AAA message (such as an access accept message) to the IP edge node, where the message carries the Line ID and the corresponding address of the VPN server.

3.7 The IP edge device sends, to the access node, a DHCP message (such as a DHCP response message) which carries the Line ID and the corresponding address of the VPN server.

3.8 After receiving the DHCP message which carries the Line ID and the corresponding address of the VPN server, the access node finds, according to the Line ID and from the correspondence between the physical line and the Line ID, the physical line that corresponds to the Line ID, and then deletes the Line ID from the DHCP message.

3.9 The access node sends, to the customer edge node and through the found physical line, the DHCP message which carries the address of the VPN server.

Further, the IP address of the VPN server may further be dynamically delivered to the customer edge node by using the TR069 protocol.

Further, the IP address of the VPN server further may be acquired according to the address of the customer edge node, such as a MAC address or an IP address. In this case, it is only required to change the Line ID in FIG. 3B to the address of the customer edge node. An acquiring process is the same as that for acquiring the IP address of the VPN server according to the Line ID, and therefore details are not repeated herein.

Further, after Step 302, the following is further included: If no VPN server is selected, the IP edge node elects a VPN server according to a preset election rule and establishes correspondence between the virtual private network and the address of the VPN server. Specifically, the preset election rule may be that, a first authenticated customer edge node on the virtual private network is used as the VPN server, or a customer edge node that has the maximum bandwidth is used as the VPN server, or the like. The correspondence between the virtual private network and the address of the VPN server may be implemented in a correspondence table, a diagram, a tree structure, or the like. The correspondence table is used as an example, as listed in Table 5. The VPN server may be a CE node on the virtual private network or a PE node on the virtual private network.

Further, after Step 302, the following is further included: The IP edge device assists the customer edge node in acquiring an IP address from a DHCP server, and sends the IP address to the customer edge node.

Further, the IP edge node monitors link status between the virtual private network and a corresponding VPN server by using session keep-alive. If a link fault between the virtual private network and the corresponding VPN server is monitored, a new VPN server is reelected according to the preset election rule, correspondence between the virtual private network and the new VPN server is established, and an address of the new VPN server is sent to each customer edge node on the virtual private network.

In this embodiment, a customer edge node acquires an address of a VPN server from an IP edge node. This enables the customer edge node to send MAC address routing information of a local site to the VPN server after MAC address learning, so that the VPN server is capable of managing and advertising MAC address routing information of each site on a virtual private network, thereby solving the following problem: Because multicast packets are filtered by an access node of the data center interconnect network, CE nodes in sites on the virtual private network cannot exchange routing information with each other by using a routing protocol. In addition, the IP edge node further monitors in real time link status between the virtual private network and the corresponding VPN server. When a link between the virtual private network and the corresponding VPN server is faulty, a new VPN server is promptly reselected to solve unexpected situations.

Referring to FIG. 4A, FIG. 4B, FIG. 4C, and FIG. 4D, a method for advertising routing information according to a fourth embodiment of the present invention is as follows:

A VPN server or a VPN server pool may be set on a VPN. The VPN server or the VPN server pool is configured to manage information of each member node on the VPN, and provide a service for querying routing information of each VPN member node.

Figure 4A:
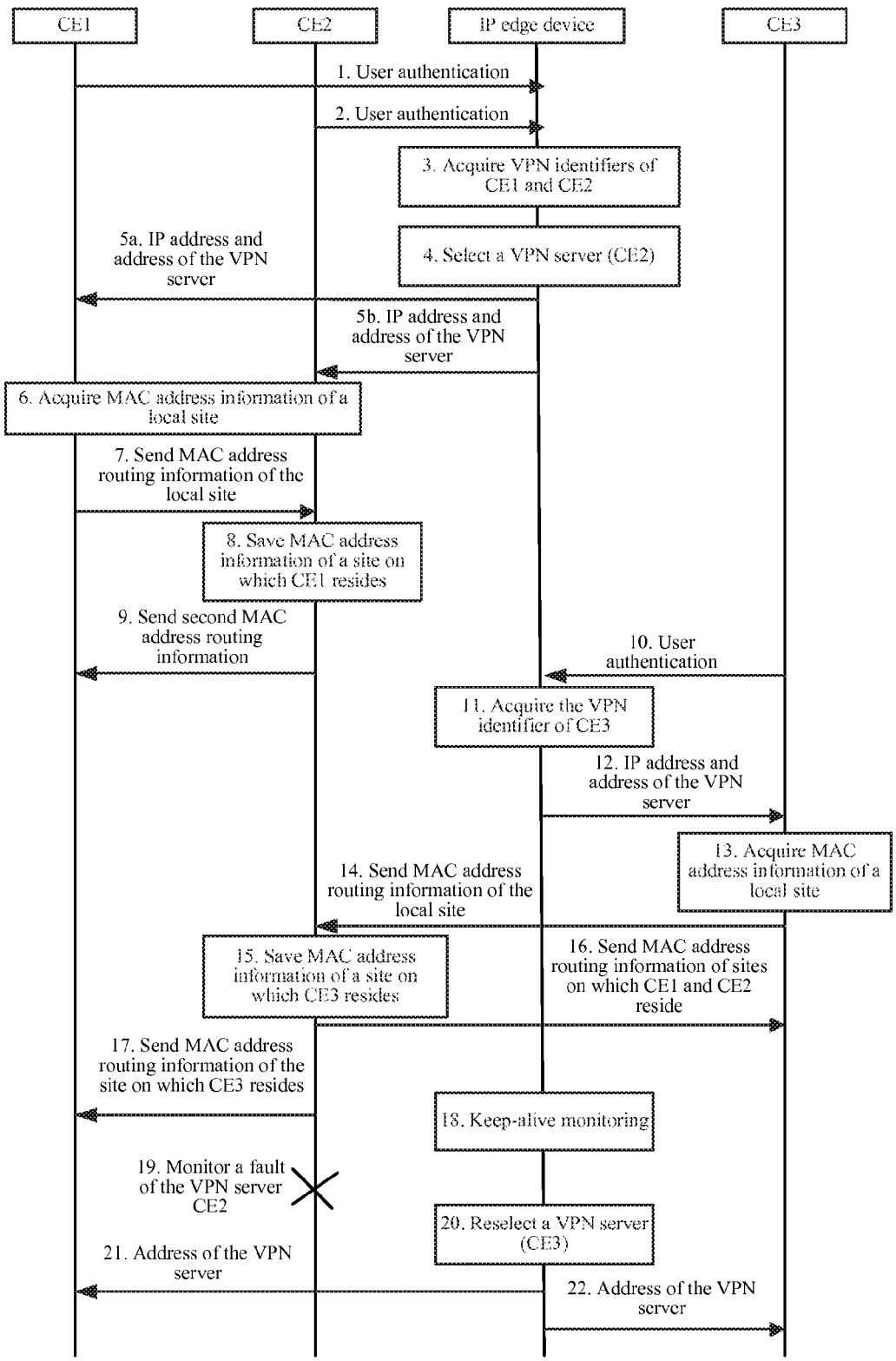
FIG. 4A is a schematic flowchart of a method for advertising routing information according to a fourth embodiment of the present invention.
Figure 4B:
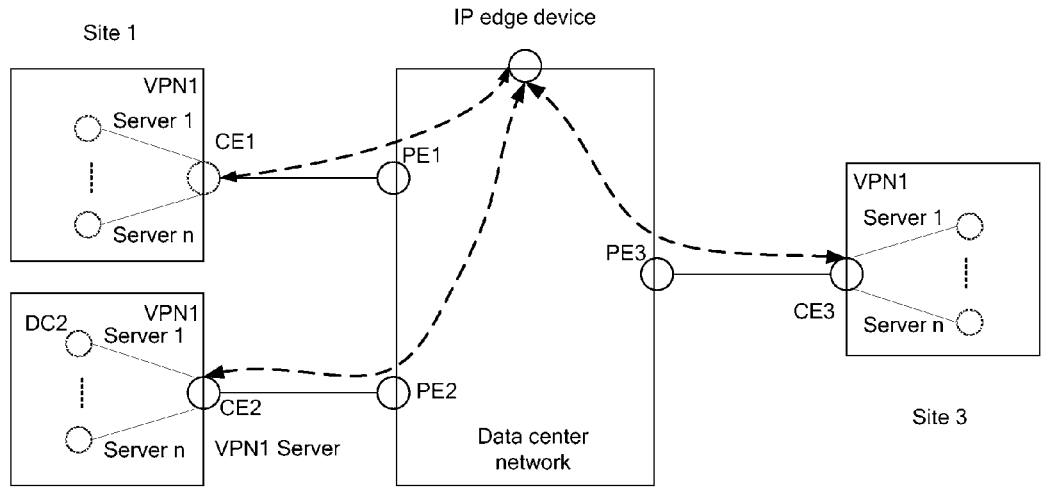
FIG. 4B is a schematic topology diagram of a method for advertising routing information according to the fourth embodiment of the present invention.

On each VPN, a VPN server or a VPN server pool is generated through election. Taking the VPN server as an example, the VPN server may be a CE, a PE, or another node (such as an AAA server). The location of the VPN server may be different on different VPNs. As shown in FIG. 4B, a server of VPN1 is located in CE2, and a VPN server of another VPN may be another node.

The VPN server is responsible for collecting MAC address routing information on a local VPN and advertising the MAC address routing information on the local VPN to each CE on the local VPN. Inside a same VPN, the VPN server performs centralized management on MAC address information. Whereas, on different VPNs, MAC address information is distributed to different VPN servers according to VPNs, to implement hybrid centralized and distributed management.

A CE advertises MAC address routing information of each node inside a site on which the CE resides to the VPN server by using a routing protocol (such as IS-IS), where the MAC address routing information includes a MAC address inside the site and an address of a CE that corresponds to the site. The address of the CE may be a MAC address or an IP address. The address of the CE that corresponds to the site is used as a next hop address during MAC address routing.

In addition, the VPN server may further be responsible for collecting IP address information on one VPN and advertising the IP address information on the VPN to each CE on the VPN. A CE may further advertise all IP address information of the nodes of a site on which the CE resides to the VPN server by using the routing protocol (such as IS-IS).

Detailed descriptions are as follows:

1. CE1 performs user authentication.

A node CE1 sends an authentication message to an IP edge node on a data center interconnect network, where the authentication message may be a DHCP message, an 802.1X message, an EAP message, or a PANA message, and the authentication message carries information of the node CE1, such as a MAC address, a user identifier, or a Line ID.

2. CE2 performs user authentication.

A node CE2 sends an authentication message to the IP edge node on the data center interconnect network, where the authentication message may be a DHCP message, an 802.1X message, an EAP message, or a PANA message, and the authentication message carries information of the node CE2, such as a MAC address, a user identifier, or a Line ID.

3. Acquire VPN identifiers of nodes CE1 and CE2.

The IP edge node acquires the identifiers of corresponding virtual private networks from preset correspondence between a customer edge node and a virtual private network according to information of nodes CE1 and CE2. Specifically, the correspondence may be implemented in a correspondence table, a diagram, a tree structure, or the like. The MAC address correspondence table is used as an example, as listed in Table 6:

TABLE 6

| MAC Address | VPN Identifier |
| --- | --- |
| 00-16-76-07-63-C4 | VPN1 |
| 10-23-59-65-89-F7 | VPN1 |
| 00-58-27-06-09-P4 | VPN1 |
| 00-58-27-06-23-K9 | VPN2 |
| 10-23-59-71-64-J8 | VPN3 |

For example, the MAC address carried in the authentication message that is sent by node CE1 is 10-23-59-65-89-F7. The IP edge node queries the preset correspondence table 6 between the customer edge node and the virtual private network according to the MAC address 10-23-59-65-89-F7. The MAC address 10-23-59-65-89-F7 corresponds to VPN1, and therefore the node CE1 resides on a virtual private network VPN1.

4. Select a VPN server.

The IP edge node elects the VPN server according to a preset election rule and establishes correspondence between a virtual private network and an address of the VPN server, where the address may be the IP address or the MAC address of the VPN server. Specifically, the preset election rule may be that, a first authenticated customer edge node on the virtual private network is used as the VPN server, or a customer edge node that has the maximum bandwidth is used as the VPN server, or the like. The correspondence between the virtual private network and the address of the VPN server may be implemented in a correspondence table, a diagram, a tree structure, or the like. The correspondence table is used as an example, as listed in Table 5 in the fourth embodiment. In this embodiment, the IP edge node selects CE2 as a VPN server of VPN1.

5a. Send the address of the VPN server and an IP address to node CE1.

The IP edge node assists the node CE1 in acquiring an IP address from a DHCP server, and acquires the address of the VPN server, that is, the address (an IP address or a MAC address) of the node CE2, and delivers the address of the VPN server and the IP address of the node CE1 to the node CE1 by extending a DHCP option.

Further, the address of the VPN server may also be acquired by extending an authentication protocol to carry the address of the VPN server, or may also be dynamically acquired by using the TR069 protocol.

5b. Send the address of the VPN server and an IP address to node CE2.

The IP edge node assists the node CE2 in acquiring an IP address from the DHCP server, and acquires the address of the VPN server, that is, the address (an IP address or a MAC address) of the node CE2, and dynamically delivers the address of the VPN server and the IP address of the node CE2 to the node CE2 by using DHCP or TR069.

Further, the address of the VPN server may also be acquired by extending the authentication protocol to carry the address of the VPN server, or may also be dynamically acquired by using the TR069 protocol.

6. The nodes CE1 and CE2 acquire MAC address information of a local site.

The nodes CE1 and CE2 acquire the MAC address information of corresponding local site through MAC address learning. Specifically, a customer edge node broadcasts a packet to all user terminals in a local site. After receiving the packet, each user terminal returns a packet to the customer edge node. The returned packet includes the MAC address of the user terminal. After receiving the returned packet, the customer edge node saves the carried MAC address to a local MAC address forwarding table. MAC address routing information of a local site is constituted by combining the learned MAC address information and address information of a next hop, that is, address information (may be an IP address or a MAC address) of a customer edge node (such as node CE1).

7. The node CE1 sends MAC address routing information of a local site to the VPN server.

After acquiring MAC address information of the local site, the node CE1 sends the MAC address routing information of the local site in a unicast manner to the VPN server. For example, a routing protocol packet which carries MAC address routing information is borne in a unicast MAC frame for transmission, where a destination MAC address of the unicast MAC frame is the MAC address of a customer edge node; or a routing protocol packet is borne in a unicast IP packet for transmission, where a destination IP address of the unicast IP packet is the IP address of a customer edge node; or a routing protocol packet is borne on a tunnel for transmission; or a routing protocol packet is transmitted as a routing protocol unicast packet.

8. The VPN server saves MAC address routing information of a site on which the node CE1 resides, where the MAC address routing information is sent by the node CE1.

9. The VPN server sends second MAC address routing information to the node CE1.

The VPN server, that is, the node CE2, sends the second MAC address routing information in the unicast manner to a customer edge node, that is, the node CE1 that corresponds to each site except a local site on the virtual private network. The second MAC address routing information is a set of MAC address routing information in the first MAC address routing information except the MAC address routing information of a destination site, and is MAC address routing information of the node CE2 herein.

Specifically, the VPN server bears a routing protocol packet, which carries the second MAC address routing information, in a unicast MAC frame for transmission, where a destination MAC address of the unicast MAC frame is the MAC address of a customer edge node; or a routing protocol packet is borne in a unicast IP packet for transmission, where the destination IP address of the unicast IP packet is the IP address of a customer edge node; or a routing protocol packet is borne on a tunnel for transmission; or a routing protocol packet is transmitted as a routing protocol unicast packet.

10. CE3 performs user authentication.

A node CE3 sends an authentication message to the IP edge node on the data center interconnect network, where the authentication message may be a DHCP message, an 802.1X message, an EAP message, or a PANA message, and the authentication message carries information of the node CE3, such as a MAC address, a user identifier, or a Line ID.

11. Acquire a VPN identifier of the node CE3.

The IP edge node acquires an identifier of a corresponding virtual private network from the preset correspondence between the customer edge node and the virtual private network according to the information of the node CE3. Specifically, the correspondence may be implemented in a correspondence table, a diagram, a tree structure, or the like. The correspondence table is used as an example. As listed in Table 6, the MAC address carried in the DHCP message that is sent by node CE3 is 00-58-27-06-09-P4. The IP edge node queries the preset correspondence table 6 between the customer edge node and the virtual private network according to the MAC address 00-58-27-06-09-P4. The MAC address 00-58-27-06-09-P4 corresponds to VPN1, and therefore the node CE3 resides on the virtual private network VPN1.

12. Send the address of the VPN server and an IP address to the node CE3.

The IP edge node assists the node CE3 in acquiring an IP address from the DHCP server, and acquires the address of the VPN server, that is, the address (an IP address or a MAC address) of the node CE2, and dynamically delivers the address of the VPN server and the IP address of the node CE3 to the node CE3 by using DHCP or TR069.

Further, the address of the VPN server may also be acquired by extending the authentication protocol to carry the address of the VPN server, or may also be dynamically acquired by using the TR069 protocol.

As shown in FIG. 4B, the IP edge node performs authenticates on nodes CE1, CE2, and CE3, assists the nodes CE1, CE2, and CE3 in acquiring IP addresses, and sends the IP addresses to the nodes CE1, CE2, and CE3 respectively. The IP edge node selects the node CE2 as the VPN server of VPN1, and sends the address of the node CE2 to the nodes CE1, CE2, and CE3 respectively.

13. The node CE3 acquires MAC address information of a local site.

The node CE3 acquires the MAC address information of the local site through MAC address learning. Specifically, a customer edge node broadcasts a packet to all user terminals in the site. After receiving the packet, each user terminal returns a packet to the customer edge node. The returned packet includes the MAC address of the user terminal. After receiving the returned packet, the customer edge node saves the carried MAC address to a local MAC address forwarding table. MAC address routing information of a local site is formed by combining the learned MAC address information and address information of a next hop, that is, address information (may be an IP address or a MAC address) of a customer edge node (such as node CE3).

14. The node CE3 sends MAC address routing information of the local site to the VPN server.

After acquiring the MAC address routing information of the local site, the node CE3 sends the MAC address routing information of the local site in the unicast manner to the VPN server. For example, a routing protocol packet which carries MAC address routing information is borne in a unicast MAC frame for transmission, where a destination MAC address of the unicast MAC frame is the MAC address of a customer edge node; or a routing protocol packet is borne in a unicast IP packet for transmission, where the destination IP address of the unicast IP packet is the IP address of a customer edge node; or a routing protocol packet is borne on a tunnel for transmission; or a routing protocol packet is transmitted as a routing protocol unicast packet.

Figure 4C:
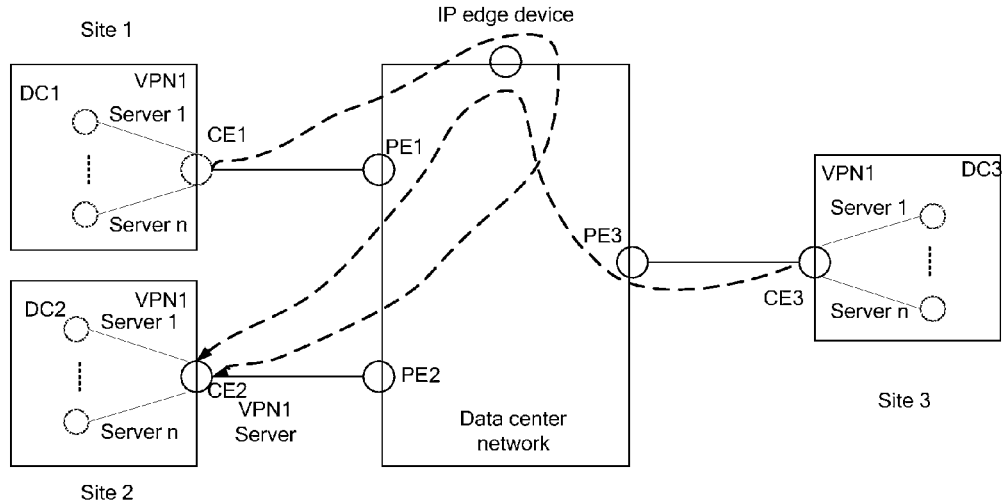
FIG. 4C is a schematic topology diagram of a method for advertising routing information according to the fourth embodiment of the present invention.
Figure 4D:
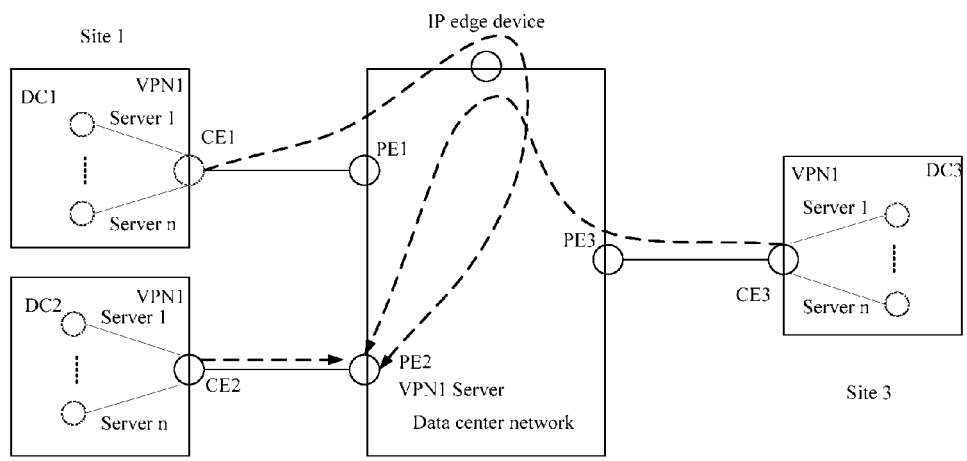
FIG. 4D is a schematic topology diagram of a method for advertising routing information according to the fourth embodiment of the present invention.

As shown by the dashed lines in FIG. 4C, the VPN server of VPN1, that is, the node CE2, collects MAC address routing information of site 1 and site 3 through the IP edge node. Nodes CE1 and CE3 send the MAC address routing information to the VPN server through the IP edge node.

The nodes CE1, CE2, and CE3 are respectively authenticated by the IP edge node. If the IP edge node selects a node PE2 as the VPN server of VPN1, as shown by the dashed lines in FIG. 4D, the nodes CE1, CE2, and CE3 separately send MAC address routing information of each site to the VPN server, that is, the node PE2.

15. The VPN server saves MAC address routing information of a site on which the node CE3 resides, where the MAC address routing information is sent by the node CE3.

16. The VPN server sends second MAC address routing information to the node CE3.

The VPN server, that is, the node CE2, sends MAC address routing information of sites on which nodes CE1 and CE2 reside to the node CE3.

Specifically, the VPN server bears a routing protocol packet, which carries the second MAC address routing information, in a unicast MAC frame for transmission, where a destination MAC address of the unicast MAC frame is the MAC address of a customer edge node; or a routing protocol packet is borne in a unicast IP packet for transmission, where the destination IP address of the unicast IP packet is the IP address of a customer edge node; or a routing protocol packet is borne on a tunnel for transmission; or a routing protocol packet is transmitted as a routing protocol unicast packet.

17. The VPN server sends second MAC address routing information to the node CE1.

The VPN server sends MAC address routing information of a site on which the new node, CE3, resides to the node CE1.

Specifically, the VPN server bears a routing protocol packet, which carries the second MAC address routing information, in a unicast MAC frame for transmission, where a destination MAC address of the unicast MAC frame is the MAC address of a customer edge node; or a routing protocol packet is borne in a unicast IP packet for transmission, where the destination IP address of the unicast IP packet is the IP address of a customer edge node; or a routing protocol packet is borne on a tunnel for transmission; or a routing protocol packet is transmitted as a routing protocol unicast packet.

Figure 4E:
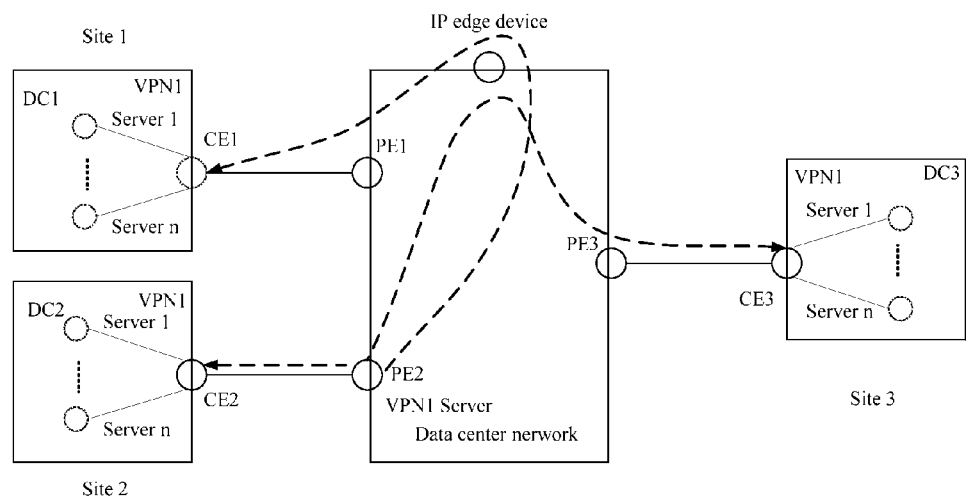
FIG. 4E is a schematic topology diagram of a method for advertising routing information according to the fourth embodiment of the present invention.

As shown by the dashed lines in FIG. 4E, the VPN server, that is, the node CE2, sends the second MAC address routing information to the nodes CE1 and CE3, respectively.

Figure 4F:
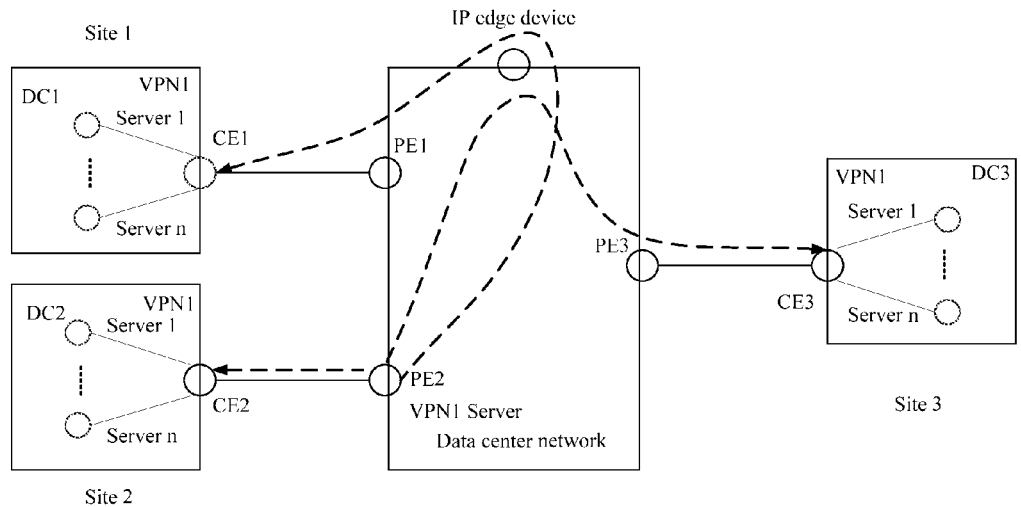
FIG. 4F is a schematic topology diagram of a method for advertising routing information according to the fourth embodiment of the present invention.

If the IP edge node selects the node PE2 as the VPN server of VPN1, then PE2 sends the second MAC address routing information to the nodes CE1, CE2, and CE3, as shown by the dashed lines in FIG. 4F.

18. Keep-alive monitoring.

The IP edge node monitors link status between the virtual private network and a corresponding VPN server by using session keep-alive. If a link fault between the virtual private network and the corresponding VPN server is monitored, a new VPN server is reelected according to the preset election rule, correspondence between the virtual private network and the new VPN server is established, and an address of the new VPN server is sent to each customer edge node on the virtual private network.

19. The IP edge node monitors that the VPN server of VPN1, that is, the node CE2, is faulty.

20. Reselect a VPN server.

The IP edge node reselects CE3 as the new VPN server of VPN1.

21. Send an address of the new VPN server to node CE1.

The IP edge node sends the address of the new VPN server, that is, the node CE3, to the node CE1. The node CE1 receives and saves the address of the VPN server, that is, the node CE3.

22. Send the address of the new VPN server to the node CE3.

The IP edge node sends the address of the new VPN server, that is, the node CE3, to the node CE3. The node CE3 receives the address of the VPN server, which is the same as its own address, and determines that CE3 itself is the VPN server of VPN1.

The new VPN server, that is, the node CE3, is responsible for collecting and sending MAC address routing information of each site on VPN1.

Figure 4G:
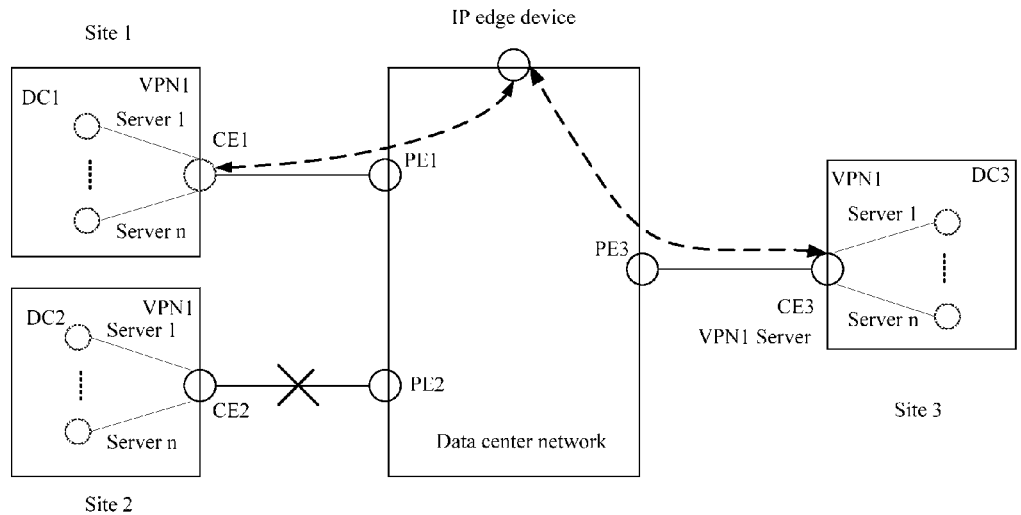
FIG. 4G is a schematic topology diagram of a method for advertising routing information according to the fourth embodiment of the present invention.

As shown in FIG. 4G, the IP edge node monitors Session interruption of the node CE2, that is, the VPN server of VPN1, as shown by the cross in FIG. 4G. The IP edge node reselects the node CE3 as the VPN server of VPN1 and updates the address of the VPN server. As shown by the dashed lines in FIG. 4G, the IP edge node sends the address of the new VPN server, that is, the address of node CE3, to the nodes CE1 and CE3, respectively.

The idea expressed in the method in this embodiment is as follows: On a network, a node is selected as a server to manage node information, such as a MAC address, of each node; first, each node on the network sends respective node information in the unicast manner to the server, and then the server arranges and sends node information of all nodes except a sending object node in the unicast manner to the sending object node. This solves the following problem brought by broadcast in a network: A certain node does not support broadcast and therefore filters out broadcast information; as a result, the broadcast information cannot be sent to other nodes on the network. On each VPN, centralized management is performed on node information of each node, whereas on the entire physical network, distributed management is performed on node information on each VPN. The idea expressed by the method in this embodiment not only can be applied to a client-based virtual private network on which cloud computing interconnection is implemented, but also can be applied to other networks where the same problem needs to be solved. In this embodiment, the client-based virtual private network on which cloud computing interconnection is implemented is used as an example to describe the present invention in detail.

In this embodiment, on a virtual private network, one VPN server is selected in advance. The VPN server is configured to manage MAC address routing information of each site. The VPN server first collects the MAC address routing information of each site on the local virtual private network, and then sends MAC address routing information of each site except a destination site in the unicast manner to a customer edge node that corresponds to each site on the virtual private network. In this way, one node on the virtual private network is used as the server to collect and send MAC address routing information on the virtual private network, thereby solving the following problem: Because multicast packets are filtered by an access node of the data center interconnect network, CE nodes in sites on the virtual private network cannot exchange routing information with each other by using a routing protocol.

Figure 5A:
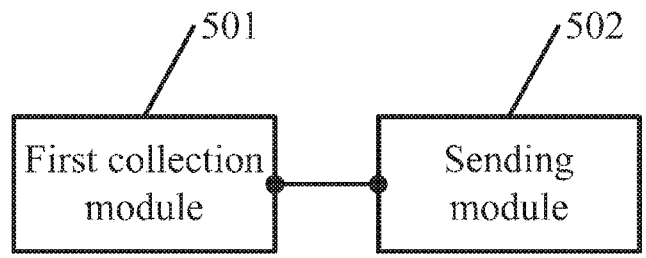
FIG. 5A is a schematic logical structure diagram of a virtual private network server device according to a fifth embodiment of the present invention.
Figure 5B:
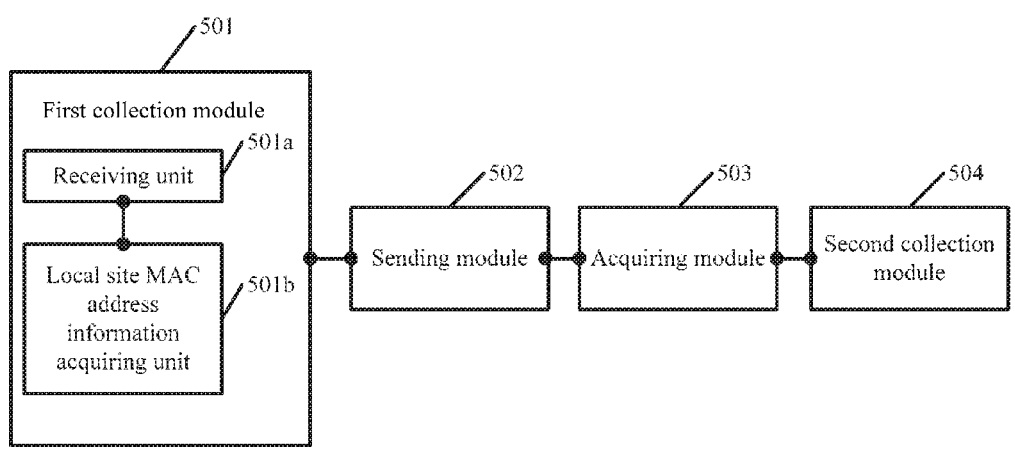
FIG. 5B is a schematic logical structure diagram of a virtual private network server device according to the fifth embodiment of the present invention.

Referring to FIG. 5A and FIG. 5B, a virtual private network server device according to a fifth embodiment of the present invention specifically includes:

referring to FIG. 5A, a first collection module 501, configured to collect first MAC address routing information, where the first MAC address routing information is a set of MAC address routing information of each site on a virtual private network on which a virtual private network server resides; and a sending module 502, configured to send second MAC address routing information in a unicast manner to a destination site, where the destination site includes multiple nodes. In this embodiment, the VPN server sends the second MAC address routing information in the unicast manner to a customer edge node that corresponds to each site except a local site, where the second MAC address routing information is a set of MAC address routing information in the first MAC address routing information except MAC address routing information of the destination site.

Further, referring to FIG. 5B, the virtual private network server device further includes:

an acquiring module 503, configured to acquire an address of the VPN server on the virtual private network, where the address may be an IP address or a MAC address; specifically, to acquire the address of the VPN server, a routing protocol packet which carries the second MAC address routing information may be borne in a unicast MAC frame for transmission, where a destination MAC address of the unicast MAC frame is the MAC address of a customer edge node; or a routing protocol packet is borne in a unicast IP packet for transmission, where a destination IP address of a unicast IP packet is the IP address of a customer edge node; or a routing protocol packet is borne on a tunnel for transmission; or a routing protocol packet is transmitted as a routing protocol unicast packet; and a second collection module 504, configured to collect information of an online customer edge node on the virtual private network on which the virtual private network server resides.

The first collection module 501 includes:

a receiving unit 501*a*, configured to receive MAC address routing information sent by a customer edge node that correspond to another site on the virtual private network; and a local site MAC address information acquiring unit 501*b*, configured to obtain MAC address information of the local site through MAC address learning.

In this embodiment, a virtual private network server device collects MAC address routing information of each site on a local virtual private network, and sends the MAC address routing information of each site except a destination site in the unicast manner to a customer edge node that corresponds to each site on the virtual private network. In this way, one node on the virtual private network is used as the server to collect and send MAC address routing information on the virtual private network, thereby solving the following problem: Because multicast packets are filtered by an access node of a data center interconnect network, CE nodes in sites on the virtual private network cannot exchange routing information with each other by using a routing protocol.

Figure 6A:
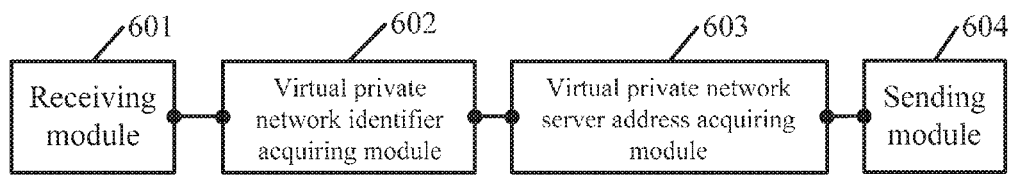
FIG. 6A is a schematic logical structure diagram of an IP edge node device according to a sixth embodiment of the present invention.
Figure 6B:
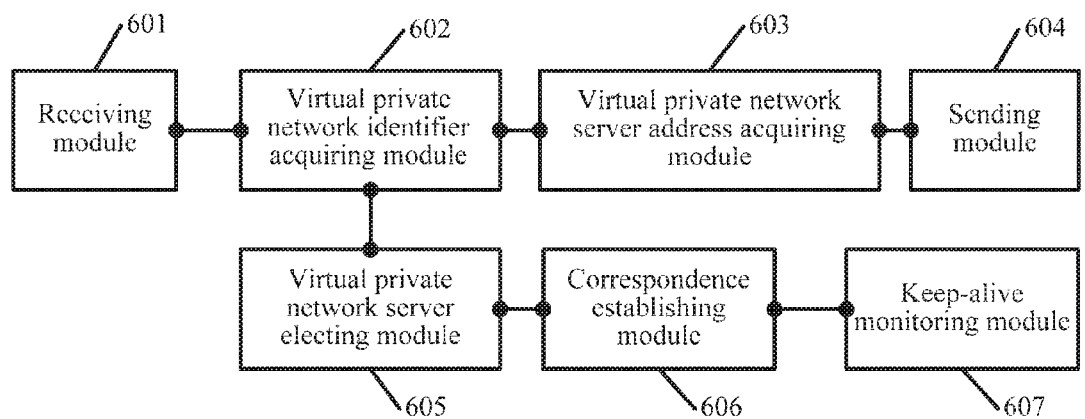
FIG. 6B is a schematic logical structure diagram of an IP edge node device according to the sixth embodiment of the present invention.

Referring to FIG. 6A and FIG. 6B, an IP edge node device according to a sixth embodiment of the present invention specifically is as follows:

Referring to FIG. 6A, the IP edge node device includes:

a receiving module 601, configured to receive an authentication message sent by a customer edge node that corresponds to each site on a virtual private network, where the authentication message may be a DHCP message, and the authentication message carries information of the customer edge node;

a virtual private network identifier acquiring module 602, configured to acquire an identifier of a corresponding virtual private network from preset correspondence between the customer edge node and the virtual private network according to the information of the customer edge node carried in the authentication message that is received by the receiving module;

a virtual private network server address acquiring module 603, configured to acquire an address of a virtual private network server according to the identifier of the virtual private network, where the address may be an IP address or a MAC address; and a sending module 604, configured to send the address acquired by the virtual private network server address acquiring module 603 to a corresponding customer edge node.

Referring to FIG. 6B, the IP edge node device further includes:

a virtual private network server electing module 605, configured to elect a virtual private network server according to a preset election rule;

a correspondence establishing module 606, configured to establish correspondence between the virtual private network and the address of the virtual private network server, where the address may be an IP address or a MAC address; and a keep-alive monitoring module 607, configured to monitor link status between the virtual private network and the corresponding virtual private network server by using session keep-alive.

The IP edge node device further includes: an IP address assignment module, configured to assist a customer edge node in acquiring an IP address, and send the IP address to the customer edge node.

In this embodiment, a customer edge node acquires an address of a VPN server from an IP edge node. This enables the customer edge node to send MAC address routing information of a local site to the VPN server after MAC address learning, so that the VPN server is capable of managing and advertising MAC address routing information of each site on a virtual private network, thereby solving the following problem: Because multicast packets are filtered by an access node of a data center interconnect network, CE nodes in sites on the virtual private network cannot exchange routing information with each other by using a routing protocol. In addition, the IP edge node further monitors in real time link status between the virtual private network and the corresponding VPN server. When a link between the virtual private network and the corresponding VPN server is faulty, a new VPN server is promptly reselected to solve unexpected situations.

Figure 7:
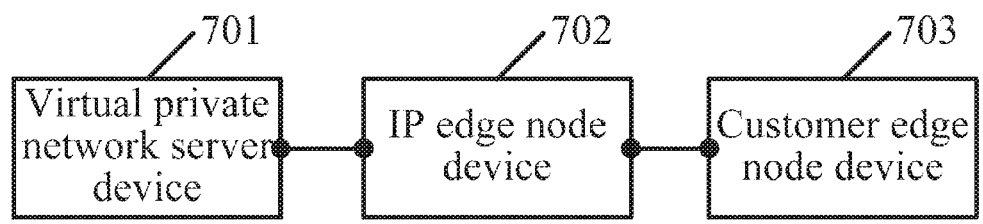
FIG. 7 is a schematic logical structure diagram of a system for advertising routing information according to a seventh embodiment of the present invention.

Referring to FIG. 7, a client-based virtual private network system according to a seventh embodiment of the present invention specifically includes:

a virtual private network server device 701 in the fifth embodiment, an IP edge node device 703 in the sixth embodiment, and a customer edge node device 702.

The customer edge node device 702 is configured to acquire an address of a VPN server on a virtual private network on which the customer edge node device 702 resides, where the address may be an IP address or a MAC address, and the details are as follows: The address of the VPN server is acquired by extending an authentication protocol to carry the address of the VPN server; or the address of the VPN server is acquired by extending a DHCP option to carry the address of the VPN address, for example, when DHCP is extended to assign an IP address, the address of the VPN server and the IP address are delivered simultaneously by extending the DHCP option to carry the address of the VPN server; or the address of the VPN server is acquired by using the TR069 protocol. The customer edge node device 702 is further configured to acquire MAC address information of a local site, where the details are as follows: The customer edge node device 702 broadcasts a packet to all user terminals in the site; after receiving the packet, each user terminal returns a packet to the customer edge node device 702, where the returned packet includes the MAC address of the user terminal; and after receiving the returned packet, the customer edge node device 702 saves the carried MAC address to a local MAC address forwarding table. The customer edge node device 702 is further configured to send MAC address routing information of the local site to the VPN server, where the details are as follows: After collecting the MAC address routing information of the local site, the customer edge node device 702 sends the MAC address routing information of the local site in a unicast manner to the VPN server, for example, a routing protocol packet which carries MAC address routing information is borne in a unicast MAC frame for transmission, where a destination MAC address of the unicast MAC frame is the MAC address of a customer edge node; or a routing protocol packet is borne in a unicast IP packet for transmission, where a destination IP address of the unicast IP packet is the IP address of a customer edge node; or a routing protocol packet is borne on a tunnel for transmission; or a routing protocol packet is transmitted as a routing protocol unicast packet.

Further, the customer edge node device 702 is further configured to: before acquiring the MAC address information of the local site, send an authentication message to an IP edge device on a data center interconnect network, where the authentication message may be a DHCP message, an 802.1X message, an EAP message, or a PANA message, and the authentication message carries information of the customer edge node device, such as a MAC address, a user name and password, a customer device identifier, or a Line ID. After receiving the authentication message, the IP edge device acquires, according to the information of the customer edge node device and from an authentication, authorization and accounting (Authentication, Authorization and Accounting, AAA) server, an identifier of a virtual private network on which the customer edge node device resides. Then, the IP edge device assists the customer edge node device in acquiring the IP address of the customer edge node device from a dynamic host configuration protocol server, and sends the acquired IP address to the customer edge node device. The customer edge node device receives the IP address assigned by the IP edge device to the customer edge node.

Further, on a client-based virtual private network system provided by an seventh embodiment of the present invention, for the detailed description of the virtual private network server device 701, reference may be made to the description in the first embodiment, the second embodiment, or the fourth embodiment; for the detailed description of the customer edge node device 702, reference may be made to the description in the fourth embodiment; and for the detailed description of the IP edge node device 703, reference may be made to the description in the third embodiment or the fourth embodiment.

In this embodiment, a virtual private network server device collects MAC address routing information of each site on a local virtual private network, and sends the MAC address routing information of each site except a destination site in the unicast manner to a customer edge node that corresponds to each site on the virtual private network. In this way, one node on the virtual private network is used as the server to collect and send MAC address routing information on the virtual private network, thereby solving the following problem: Because multicast packets are filtered by an access node of the data center interconnect network, CE nodes in sites on the virtual private network cannot exchange routing information with each other by using a routing protocol.

Persons of ordinary skill in the art may understand that all or part of the steps of the methods in the embodiments may be implemented by a program instructing relevant hardware. The program may be stored in a computer readable storage medium, and the storage medium may be a read-only memory (ROM, Read Only Memory), a random access memory (RAM, Random Access Memory), a magnetic disk, or an optical disk.

The foregoing describes in detail the method, the device, and the virtual private network system for advertising routing information provided in the embodiments of the present invention. Specific cases are used for illustrating principles and embodiments of the present invention. The foregoing description about the embodiments is merely for understanding the method and core ideas of the present invention. Meanwhile, a person skilled in the art may make modifications to the specific implementation manners and application scopes according to the idea of the present invention. In conclusion, the content of this specification should not be construed as a limitation on the present invention.

What is claimed is:

1. A method for advertising routing information, the method comprising:
   collecting, by a virtual private network server, first media access control (MAC) address routing information, wherein the first MAC address routing information comprises MAC address routing information of each of multiple sites on a virtual private network on which the virtual private network server resides, the virtual private network is a data center interconnect network and each site is a data center, and the virtual private network server is elected from devices of the virtual private network, and is configured to manage the MAC address routing information of each of the multiple sites on the virtual private network; and
   sending, by the virtual private network server, second MAC address routing information in a unicast manner to a destination site, wherein the second MAC address routing information is part of the first MAC address routing information except MAC address routing information of the destination site,
   wherein the second MAC address routing information comprises MAC address routing information of at least two sites on the virtual private network and MAC address routing information of one of the at least two sites is a combination of MAC address information of each node on the one site and MAC address routing information of a customer edge node on the one site.

2. The method according to claim 1, wherein before collecting the first MAC address routing information, the method further comprising:
   acquiring, by the virtual private network server, an address of the virtual private network server, wherein the address of the virtual private network server comprises one of the groups consisting of an IP address and a MAC address.

3. The method according to claim 2, wherein acquiring the address of the virtual private network server comprises one of the group consisting of:
   acquiring the address of the virtual private network server by extending an authentication protocol to carry the address of the virtual private network server;
   acquiring the address of the virtual private network server by extending a dynamic host configuration protocol option to carry the address of the virtual private network server; and
   acquiring the address of the virtual private network server by using the TR069 protocol.

4. The method according to claim 3, wherein acquiring the address of the virtual private network server by extending the dynamic host configuration protocol option to carry the address of the virtual private network server comprises:
   when the dynamic host configuration protocol is extended to assign an IP address to a customer edge node, simultaneously delivering the address of the virtual private network server and the IP address assigned to the customer edge node by extending the dynamic host configuration protocol option to carry the address of the virtual private network server.

5. The method according to claim 1, further comprising:
   collecting, by the virtual private network server, information of an online customer edge node on the virtual private network on which the virtual private network server resides.

6. The method according to claim 5, wherein collecting the first MAC address routing information comprises one of the group consisting of:

receiving, by the virtual private network server, MAC address routing information sent by each customer edge node that corresponds to a site other than the site of the virtual private network server in a unicast manner on the virtual private network, and obtaining MAC address information of the site of the virtual private network server through MAC address learning when the virtual private network server is a customer edge node; and receiving, by the virtual private network server, MAC address routing information sent by a customer edge node that corresponds to each site on the virtual private network when the virtual private network server is not a customer edge node.

7. The method according to claim 1, wherein sending, by the virtual private network server, the second MAC address routing information in the unicast manner to the destination site comprises one of the group consisting of:

bearing a routing protocol packet, which carries the second MAC address routing information, in a unicast MAC frame for transmission, wherein a destination MAC address of the unicast MAC frame is a MAC address of a customer edge node;

bearing a routing protocol packet in a unicast IP packet for transmission, wherein the destination IP address of the unicast IP packet is an IP address of the customer edge;

bearing a routing protocol packet on a tunnel for transmission; and transmitting a routing protocol packet as a routing protocol unicast packet.

8. A virtual private network server, wherein the virtual private network server is a node configured to manage media access control (MAC) address routing information of each of multiple sites on a virtual private network and is elected from devices of a virtual private network, the server comprises:

a memory that stores instructions; and a processor configured to execute the instructions to:

collect first MAC address routing information, wherein the first MAC address routing information comprises MAC address routing information of each of the multiple sites on the virtual private network, the virtual private network is a data center interconnect network and each site is a data center; and send second MAC address routing information in a unicast manner to a destination site, wherein the second MAC address routing information is part of the first MAC address routing information except MAC address routing information of the destination site; wherein the second MAC address routing information comprises MAC address routing information of at least two sites on the virtual private network and MAC address routing information of one of the at least two sites is a combination of MAC address information of each node on the one site and MAC address routing information of a customer edge node on the one site.

9. The virtual private network server according to claim 8, wherein the processor is further configured to execute the instructions to:

acquire an address of the virtual private network server device on the virtual private network, wherein the address of the virtual private network server device comprises one of the group consisting of an IP address and a MAC address; and collect information of an online customer edge node on the virtual private network.

10. The virtual private network server according to claim 8, wherein the processor is further configured to execute the instructions to:

receive MAC address routing information sent by each customer edge node that corresponds to a site other than the site of the virtual private network server in a unicast manner on the virtual private network; and obtain the MAC address information of a local site through MAC address learning.

11. A client-based virtual private network system comprising:

a virtual private network server, configured to collect first media access control (MAC) address routing information, wherein the first MAC address routing information comprises MAC address routing information of each of multiple sites on a virtual private network on which the virtual private network server resides, the virtual private network is a data center interconnect network and each site is a data center, and the virtual private network server is elected from devices of the virtual private network, and is configured to manage the MAC address routing information of each of the multiple sites on the virtual private network, and send second MAC address routing information in a unicast manner to a destination site, wherein the second MAC address routing information is part of the first MAC address routing information except MAC address routing information of the destination site; wherein the second MAC address routing information comprises MAC address routing information of at least two sites;

an IP edge node, configured to acquire an address of the virtual private network server and send the address of the virtual private network server to a customer edge node; wherein the IP edge node is located outside each site; and the customer edge node, configured to acquire the address of the virtual private network server on the virtual private network on which the customer edge node resides and MAC address information of a local site, and then send the MAC address routing information of the local site to the virtual private network server, wherein the address of the virtual private network server is one of an IP address and a MAC address on the virtual private network and MAC address routing information of one of the at least two sites is a combination of MAC address information of each node on the one site and MAC address routing information of a customer edge node on the one site.

12. The system according to claim 11, wherein the virtual private network server is further configured to acquire the address of the virtual private network server on the virtual private network, wherein the address of the virtual private network server comprises one of the IP address and the MAC address, and collect information of an online customer edge node on the virtual private network.

13. The system according to claim 11, wherein the virtual private network server is configured to receive MAC address routing information sent by a customer edge node that corresponds to another site on the virtual private network and obtain the MAC address information of the local site through MAC address learning.

14. The system according to claim 11, wherein the IP edge node is further configured to elect the virtual private network server according to a preset election rule;

establish correspondence between the virtual private network and the address of the virtual private network server; and monitor link status between the virtual private network and the corresponding virtual private network server by using session keep-alive.

* * * * *